(12) United States Patent
Coulon et al.

(10) Patent No.: US 7,036,320 B2
(45) Date of Patent: May 2, 2006

(54) GAS TURBINE WITH STATOR SHROUD IN THE CAVITY BENEATH THE CHAMBER

(75) Inventors: Sylvie Coulon, Bois le Roi (FR); Jean-Claude Taillant, Vaux le Penil (FR); Michel Hacault, Massy (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/513,447

(22) PCT Filed: May 16, 2003

(86) PCT No.: PCT/FR03/01497

§ 371 (c)(1),
(2), (4) Date: Nov. 4, 2004

(87) PCT Pub. No.: WO03/098020

PCT Pub. Date: Nov. 27, 2003

(65) Prior Publication Data

US 2005/0172642 A1 Aug. 11, 2005

(30) Foreign Application Priority Data

May 16, 2002 (FR) .................................. 02 06010

(51) Int. Cl.
*F02C 7/18* (2006.01)
(52) U.S. Cl. .......................... 60/785; 60/806
(58) Field of Classification Search ................ 60/726, 60/782, 785, 806, 751
See application file for complete search history.

(56) References Cited

U.S. PATENT DOCUMENTS

| 4,416,111 A | 11/1983 | Lenahan et al. |
| 4,466,239 A * | 8/1984 | Napoli et al. .................. 60/782 |
| 4,852,355 A | 8/1989 | Kenworthy et al. |
| 4,920,741 A | 5/1990 | Liebl |
| 5,003,773 A | 4/1991 | Beckwith |
| 5,586,860 A | 12/1996 | Bertrand et al. |
| 6,722,138 B1 * | 4/2004 | Soechting et al. ............ 60/785 |

FOREIGN PATENT DOCUMENTS

| FR | 2 030 993 | 11/1970 |
| GB | 2 084 654 | 4/1982 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A turbomachine including a high pressure compressor with a downstream cone, a diffuser extending downstream by an inner casing disposed radially outside the downstream compressor cone, a combustion chamber disposed radially outside the inner diffuser casing, and a high pressure turbine whose rotor is connected to the downstream cone of the compressor by a connection drum, the inner diffuser casing and the downstream compressor cone defining between them an under-chamber cavity that is situated downstream from a discharge labyrinth in which cooling air flows downstream, wherein the engine also includes a stator shroud that is installed under the inner diffuser casing downstream from the discharge labyrinth.

12 Claims, 2 Drawing Sheets

GAS TURBINE WITH STATOR SHROUD IN THE CAVITY BENEATH THE CHAMBER

The invention relates to the ventilation of a high pressure turbine wheel.

The invention relates more precisely to a turbomachine of axis X and comprising, from upstream to downstream, a high pressure compressor whose rotor presents a downstream cone, a diffuser extending downstream beside the axis X by an inner casing disposed radially outside said downstream compressor cone, a combustion chamber disposed radially outside said inner diffuser casing, and a high pressure turbine whose rotor is connected to the downstream compressor cone by a connection drum, the inner diffuser casing and the downstream compressor cone defining between them an under-chamber cavity that is situated downstream from a discharge labyrinth in which cavity cooling air flows downstream.

Figure 1:
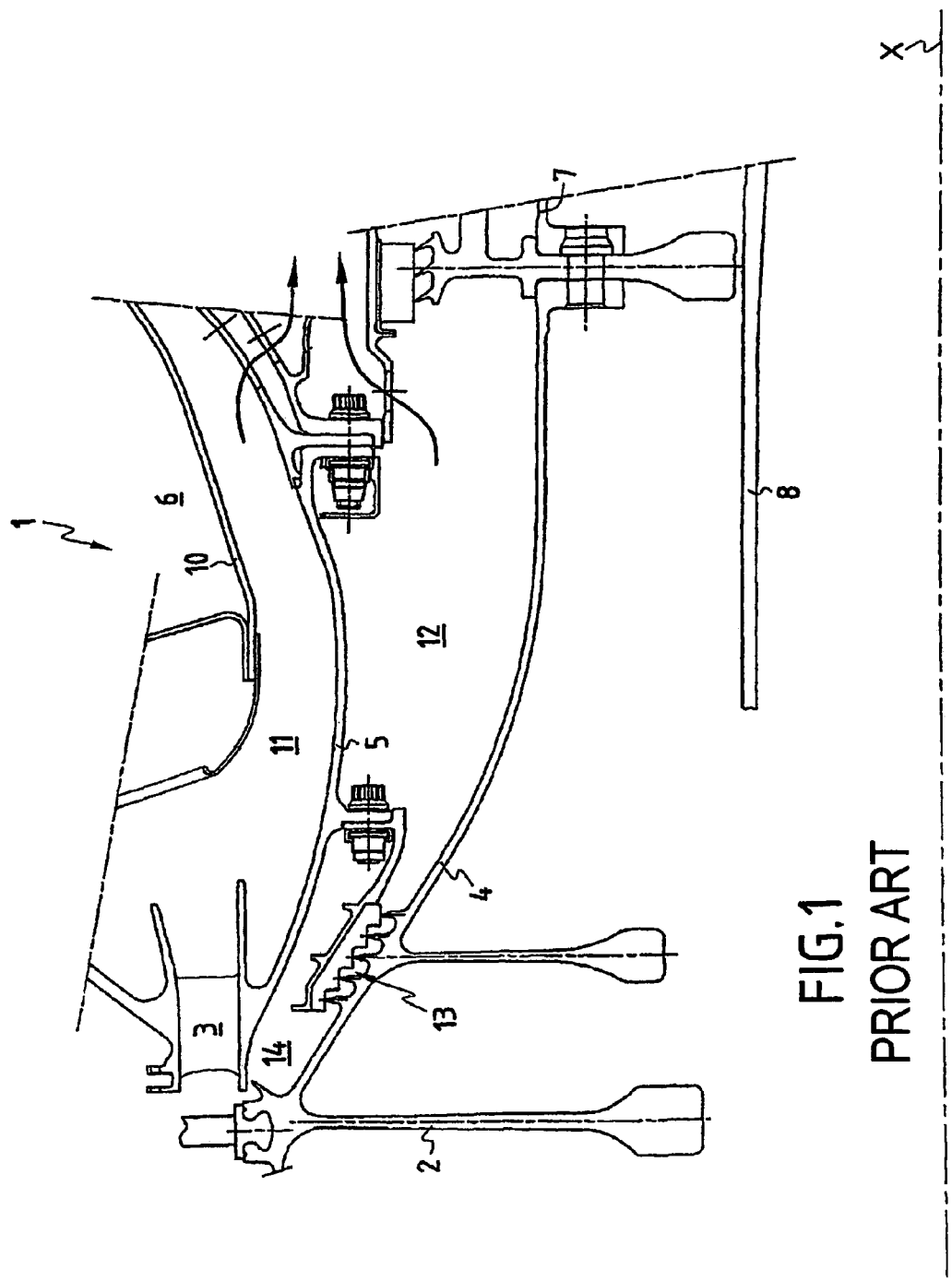

Such a turbomachine 1 of axis X is shown in FIG. 1. Reference 2 designates the disk of the last stage of the high pressure compressor, which disk carries blades at its periphery disposed at the inlet to a diffuser 3. The rotor of the compressor extends downstream via a downstream cone 4 disposed radially inside an inner casing 5 extending the radially inner portion of the diffuser 3. An annular combustion chamber 6 is mounted around the inner casing 5. The combustion chamber 6 delivers hot gases to a stator, not shown in the figure, disposed upstream from the first stage of a high pressure turbine whose rotor is connected by a connection drum 7 to the downstream cone 4, in order to cause the rotor of the high pressure compressor to rotate. Reference 8 designates the low pressure shaft which connects a low pressure turbine disposed downstream from the high pressure turbine to a low pressure compressor disposed upstream from the high pressure turbine and optionally, for a turbojet engine, to a fan.

In conjunction with the inner jacket 10 of the combustion chamber, the inner casing 5 of the diffuser 3 defines an annular passage 11 for the air flow that is delivered by the diffuser 3 and that is for burning the fuel in the primary zone of the combustion chamber and for diluting the combustion gases in the dilution zone in order to reduce the temperature of the hot gases delivered to the high pressure turbine. A portion of the air flow going through the annular passage 11 may advantageously serve for cooling the blades in the high pressure turbine.

The inner casing 5 of the diffuser 3 and the downstream cone 4 of the high pressure compressor define between them an annular cavity 12 that is located radially under the inner casing 5 downstream from a discharge labyrinth 13 mounted under the diffuser 3 for providing sealing between the inner casing 5 and the downstream cone 4 of the high pressure compressor rotor.

A leakage air flow penetrates into the chamber 14 that is located upstream from the discharge labyrinth 13 under the diffuser 3, through the gap separating the upstream end of the radially inner portion of the diffuser 3 from the downstream end of the periphery of the compressor disk 2. This air flows into the annular cavity 12 via the discharge labyrinth 13 and serves to cool the downstream cone 4 of the compressor rotor, and also the upstream surfaces of the turbine rotor, and particularly of the upstream flange of the turbine disk, then the air flow is discharged into the stream of hot gases by passing through the venting cavity that is located between the stator and the turbine rotor.

The annular cavity 12 has a radial section which flares downstream, and the air which flows therein loses speed as it travels downstream and is subjected to large rises in temperature, that are related to the power generated by the friction of the air rubbing against the walls of the inner casing 5. The temperature rises increase with increasing stator friction area, and they may reach a value close to 100° C.

The object of the invention is to reduce the power generated in the annular cavity 12 in order to reduce the temperature of the cooling air flow therein.

The invention achieves this object by the fact that the turbomachine also includes a stator shroud that is installed under the inner diffuser casing downstream from the discharge labyrinth.

Hence, the radii of the stator in this region are greatly reduced, which leads to a reduction of the friction areas of the stator, and to a reduction in the power generated by friction.

Advantageously, the cross section of the annular cavity defined by the stator shroud and by the downstream cone is substantially constant from upstream to downstream.

This disposition allows for the air to flow at a substantially uniform speed in the annular cavity, and reduces the time taken by the air to flow through this zone.

Moreover, the stator shroud and the inner casing of the diffuser define between them an annular chamber that separates the annular cavity from the annular passage located around the inner casing of the diffuser. The temperature in the annular chamber is substantially equal to half the sum of the temperatures of the two air flows, which makes it possible to reduce the heat exchanges between the two air flows.

Figure 2:
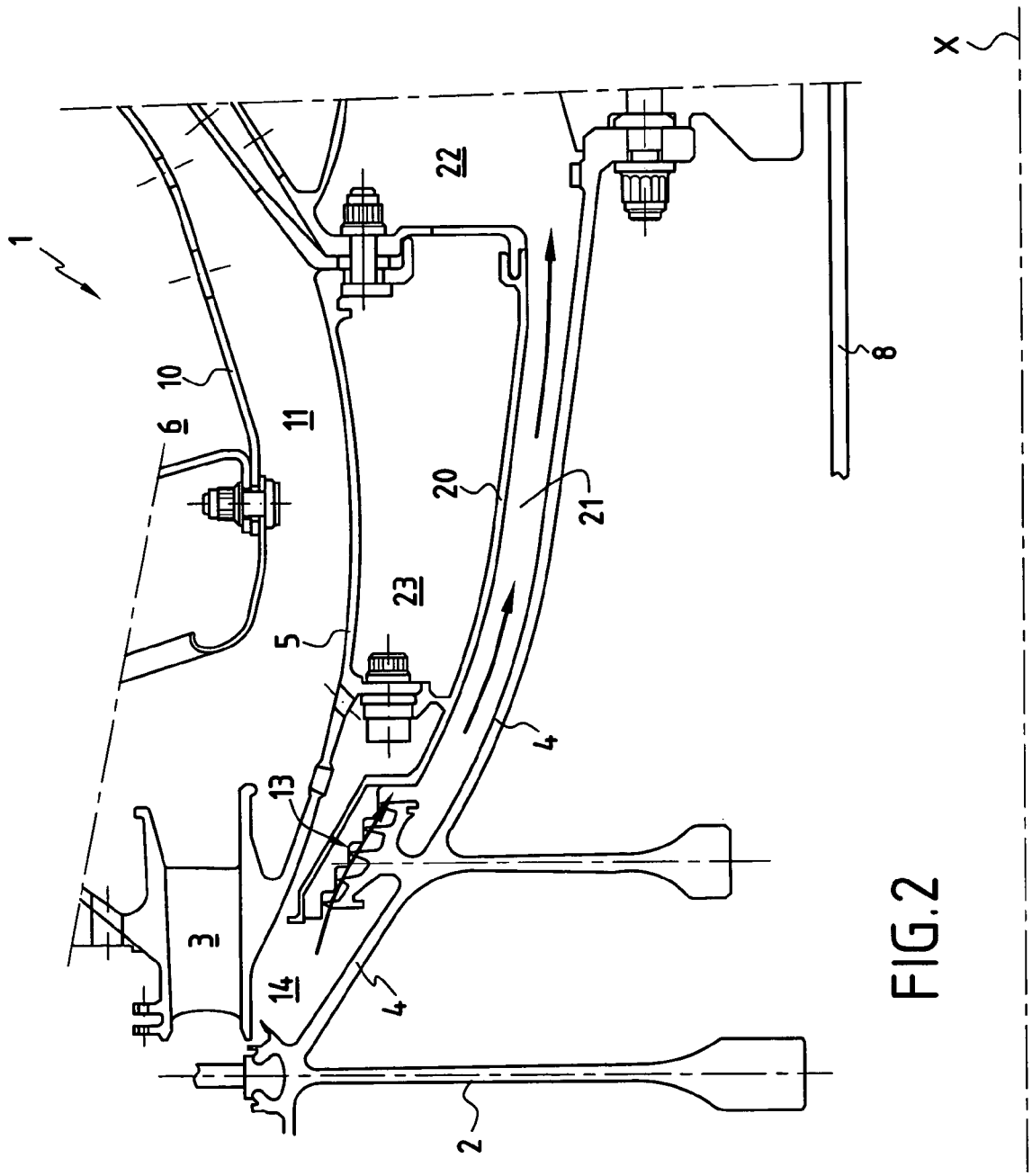

Other characteristics and advantages of the invention appear on reading the following description, given by way of example and with reference to the accompanying figures, in which:

FIG. 1 is a half-section of the portion that is located under the combustion chamber of a turbomachine of the prior art; and FIG. 2 is a half-section of the portion that is located under the combustion chamber of a turbomachine of the invention.

The state of the art shown in FIG. 1 is described in the introduction above and needs no further explanation.

FIG. 2 shows the portion of a turbomachine of the invention that is located radially inside the combustion chamber 6, downstream from the last stage of a high pressure compressor.

As in the state of the art, the disk 2 of the compressor extends downstream via a downstream cone 4 connected to the connection drum of the high pressure turbine rotor. The diffuser 3 also includes an inner casing 5 that flares downstream and that is disposed inside the jacket 10 that is radially inside the combustion chamber 6 and it co-operates with said casing to define a passage 11 for conveying the air flow delivered by the diffuser 3. A discharge labyrinth 13 is provided under the diffuser 3 between the inner casing 5 and the downstream cone 4.

In the invention, a stator shroud 20 is installed under the inner casing 5 downstream from the discharge labyrinth 13. Downstream from the discharge labyrinth 13, the shroud 20 and the downstream cone 4 define a conical annular passage 21, with radial thickness or cross-section that is substantially constant throughout the entire length of the shroud 20.

The conical annular passage 21, whose radius decreases upstream to downstream, conveys a leakage flow which passes through the discharge labyrinth 13 towards an enclosure 22 that is located downstream from the shroud 20, in order to cool the upstream faces of the turbine rotor.

The shroud 20 and the inner casing 5 of the diffuser 3 define a chamber 23 which thermally insulates the main air flow in the passage 11 and the leakage flow in the conical annular passage 21. The air contained in this chamber 23 is at an intermediate temperature between the temperature of the main air flow and the temperature of the leakage flow.

Installing the stator shroud 20 under the inner casing 5 of the diffuser 3 makes it possible to reduce the friction areas of the stator to a remarkable degree, thereby reducing the power generated in the annular passage 21.

For the same leakage flow through the discharge labyrinth 13, the temperature of the air when entering the enclosure 22 is reduced by a value which may be as much as 26° C.

Conversely, if the leakage flow through the discharge labyrinth 13 is reduced so that the temperature of the air in the enclosure 22 is the same as the temperature in the chamber without the shroud 20, then the saving in specific fuel consumption may be estimated at about 0.1%.

The invention claimed is:

1. A turbomachine having an axis comprising, from upstream to downstream, a high pressure compressor whose rotor presents a downstream cone, a diffuser extending downstream beside the axis by an inner casing disposed radially outside said downstream compressor cone, a combustion chamber disposed radially outside said inner diffuser casing, and a high pressure turbine whose rotor is connected to the downstream compressor cone by a connection drum, the inner diffuser casing and the downstream compressor cone defining between them an annular cavity that is situated downstream from a discharge labyrinth and in which cooling air flows downstream, wherein a stator shroud is installed radially internally from the inner diffuser casing downstream from the discharge labyrinth to define with said diffuser casing a closed thermally insulating chamber.

2. The turbomachine according to claim 1, wherein said stator shroud is shaped so that the cross section of the annular cavity defined by the stator shroud and the downstream cone is substantially constant from upstream to downstream.

3. The turbomachine according to claim 1, wherein a temperature of the air in the closed thermally insulating chamber is between a temperature of an air flowing through the diffuser and a temperature of an air flowing through the annular cavity.

4. The turbomachine according to claim 3, wherein the temperature of the air in the closed thermally insulating chamber is substantially equal to half the sum of the temperature of the air flowing through the diffuser and the temperature of the air flowing through the annular cavity.

5. The turbomachine according to claim 1, wherein, for a given air flow rate through the annular cavity, a temperature of an air flowing into an enclosure located downstream from the annular cavity is reduced by as much as 26° C.

6. The turbomachine according to claim 1, wherein, if an air flow rate through the annular cavity is reduced such that a temperature of an air flowing into an enclosure located downstream from the annular cavity is the same as in a chamber without the closed thermally insulating chamber, a reduction in specific fuel consumption of the turbomachine is estimated to be about 0.1%.

7. A turbomachine, comprising:
a high pressure compressor including a compressor cone;
a diffuser including an inner diffuser casing forming with an Outside jacket a main flow passage, the inner diffuser casing being disposed radially outside the compressor cone;
a combustion chamber disposed radially outside the inner diffuser casing, the combustion chamber receiving an air flow flowing through the main flow passage;
a high pressure turbine having a rotor connected to the compressor cone via a connection drum, the inner diffuser casing and the compressor cone defining therebetween an annular cavity;
a discharge labyrinth disposed under the diffuser between the inner diffuser casing and the compressor cone; and
a stator shroud disposed radially internally from the inner diffuser casing downstream from the discharge labyrinth, the stator shroud defining with the diffuser inner casing a closed chamber and with the compressor cone a leakage air flow passage for air flowing through the discharge labyrinth.

8. The turbomachine according to claim 7, wherein a cross section of the leakage air flow passage is substantially constant along an axial direction of the turbomachine.

9. The turbomachine according to claim 7, wherein a temperature of the air in the closed chamber is between a temperature of an air flowing through the main flow passage and a temperature of an air flowing through the leakage air flow passage.

10. The turbomachine according to claim 9, wherein the temperature of the air in the closed chamber is substantially equal to half the sum of the temperature of the air flowing through the main flow passage and the temperature of the air flowing through the leakage air flow passage.

11. The turbomachine according to claim 7, wherein, for a given air flow rate through the leakage air flow passage, a temperature of an air flowing into an enclosure located downstream from the leakage air flow passage is reduced by as much as 26° C.

12. The turbomachine according to claim 7, wherein, if an air flow rate through the leakage air flow passage is reduced such that a temperature of an air flowing into an enclosure located downstream from the leakage air flow passage is the same as in a chamber without the stator shroud, a reduction in a specific fuel consumption of the turbomachine is estimated to be about 0.1%.

* * * * *